United States Patent
Blair et al.

(10) Patent No.: US 7,107,423 B2
(45) Date of Patent: Sep. 12, 2006

(54) METHODS AND APPARATUS FOR DATA RETRIEVAL

(75) Inventors: Timothy P. Blair, Boise, ID (US); Roger T. Baird, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 404 days.

(21) Appl. No.: 10/616,762

(22) Filed: Jul. 10, 2003

(65) Prior Publication Data

US 2005/0010672 A1    Jan. 13, 2005

(51) Int. Cl.
*G06F 12/00* (2006.01)
(52) U.S. Cl. .............................. 711/167; 709/217
(58) Field of Classification Search ............... None
See application file for complete search history.

(56) References Cited

U.S. PATENT DOCUMENTS

| | | | |
|---|---|---|---|
| 5,926,649 A | 7/1999 | Ma et al. | |
| 6,111,570 A | 8/2000 | Sugikawa et al. | |
| 6,272,131 B1 * | 8/2001 | Ofek | 370/389 |
| 6,330,652 B1 | 12/2001 | Robb | |
| 6,343,122 B1 * | 1/2002 | Andersson | 379/219 |
| 6,421,342 B1 | 7/2002 | Schwartz et al. | |
| 6,735,679 B1 * | 5/2004 | Herbst et al. | 711/167 |
| 6,760,328 B1 * | 7/2004 | Ofek | 370/389 |
| 6,775,756 B1 * | 8/2004 | Thusoo et al. | 711/169 |
| 6,934,818 B1 * | 8/2005 | Okada | 711/154 |
| 2003/0225988 A1 * | 12/2003 | Ralphs | 711/167 |

FOREIGN PATENT DOCUMENTS

WO        WO01/55930        8/2001

OTHER PUBLICATIONS

Bhide, M. et al. "Efficiently maintaining stock portfolios up-to-date on the Web", Research Issues in Data Engineering: Engineering e-Commerce/e-Business Systems. Feb. 24, 2002.
Ling, Liu et al. "Differential evaluation of continual queries", Distributed Computing Systems. May 27, 1996.

* cited by examiner

*Primary Examiner*—Reginald G. Bragdon
*Assistant Examiner*—Horace Flournoy

(57) ABSTRACT

Representative embodiments provide for a data handling system including a remote entity and a local entity coupled in data communication with the remote entity. The local entity is configured to wait for a predefined interval of time, retrieve a quantity of data from the remote entity after the predefined interval of time, and redefine the interval of time in accordance with a predefined function. A method of retrieving data includes waiting for a predefined interval of time, retrieving a quantity of data from a remote entity after the predefined interval of time, and redefining the interval of time in accordance with a predefined function.

32 Claims, 4 Drawing Sheets

METHODS AND APPARATUS FOR DATA RETRIEVAL

BACKGROUND

Various types of data handling systems are known in the related arts. One type of data handling system generally includes one or more remotely located data generation entities (i.e., field offices having file servers, user computers, etc.) that are coupled in data communication with a local data retrieval and storage entity (i.e., main office having large storage facilities, mainframe computers, etc.).

Under such a system, the local entity typically retrieves (i.e., gathers) data files from the remote entity or entities at fixed intervals of time for storage, processing, or other tasks. Upon (or shortly after) retrieval of the data files, each remote entity generally deletes their copies of the retrieved files so that storage space within the remote entity can be reclaimed for future data files or other usage.

However, the rate at which new data files are generated (i.e., drafted or created) typically varies within each remote entity due, for example, to present workload, holiday or special periods, phase of business cycle, etc. As a result, the rate at which data file storage space is consumed within the remote entity varies correspondingly. This can lead to insufficient data file storage space within the remote entity if the fixed interval between data file retrievals by the local entity is too great for the present rate of data file generation.

Thus, it is desirable to provide methods and apparatus for use with data handling systems that address the problems described above.

SUMMARY

One embodiment provides for a method of retrieving data, including the steps of waiting for a predefined interval of time, retrieving a first quantity of data from a remote entity after the predefined interval of time, and redefining the interval of time in accordance with a predefined function.

Another embodiment provides for a computer-accessible storage media including an executable program code. The program code is configured to cause a processor to wait for a predefined interval of time, and thereafter retrieve a first quantity of data. The program code is further configured to cause the processor to redefine the interval of time in accordance with a predefined function.

Yet another embodiment provides for a data system, including a remote entity configured to store data, and a user computer coupled in data communication with the remote entity. The user computer is configured to generate and store data within the remote entity. The data system further includes a local entity coupled in data communication with the remote entity. The local entity is configured to wait for a predefined interval of time, and to retrieve a first quantity of data from the remote entity after the predefined interval of time. The first quantity of data defines a retrieval quantity. The local entity is also configured to divide the predefined interval of time by the retrieval quantity to define a data creation period, and then to multiply the data creation period by a predefined quantity to redefine the interval of time. The local entity is further configured to wait for the redefined interval of time, and thereafter to retrieve a second quantity of data from the remote entity.

These and other aspects and embodiments will now be described in detail with reference to the accompanying drawings, wherein:

DETAILED DESCRIPTION

In representative embodiments, the present teachings provide methods and apparatus for retrieving data using a local entity in correspondence to a rate at which the data is being generated within a remote entity. As used herein, a remote entity can be generally defined by any device or system that is usable to generate quantities of data and/or store that data in electronic form (i.e., a data file or files) in preparation for retrieval by a local entity. In turn, a local entity generally refers to any device or system in accordance with the present invention that is usable to electronically retrieve data generated by one or more remote entities.

Thus, remote and local entities can be respectively defined by a relatively wide variety of devices such as servers, user computers, computer-accessible file storage arrays, etc. As further used herein, a main office generally refers to the location of a local entity, while remote entities are generally respectively associated with (i.e., located within) field offices or other locations that are considered remote with respect to the main office. The term 'office' is used herein exemplify the sort of usage environment typical to the present invention, but is in no way intended limit the use or application of the present invention to office environments in the conventional sense.

Therefore, broadly speaking, the present invention is generally directed to the systematic retrieval of electronic data files from one or more remote entities respectively located within a remote office or offices, by a local entity within a main office, by way of any suitable electronic communications infrastructure. Typical such infrastructures include, for example, the Internet, a local area network (LAN), a wide are network (WAN), etc.

Figure 1:
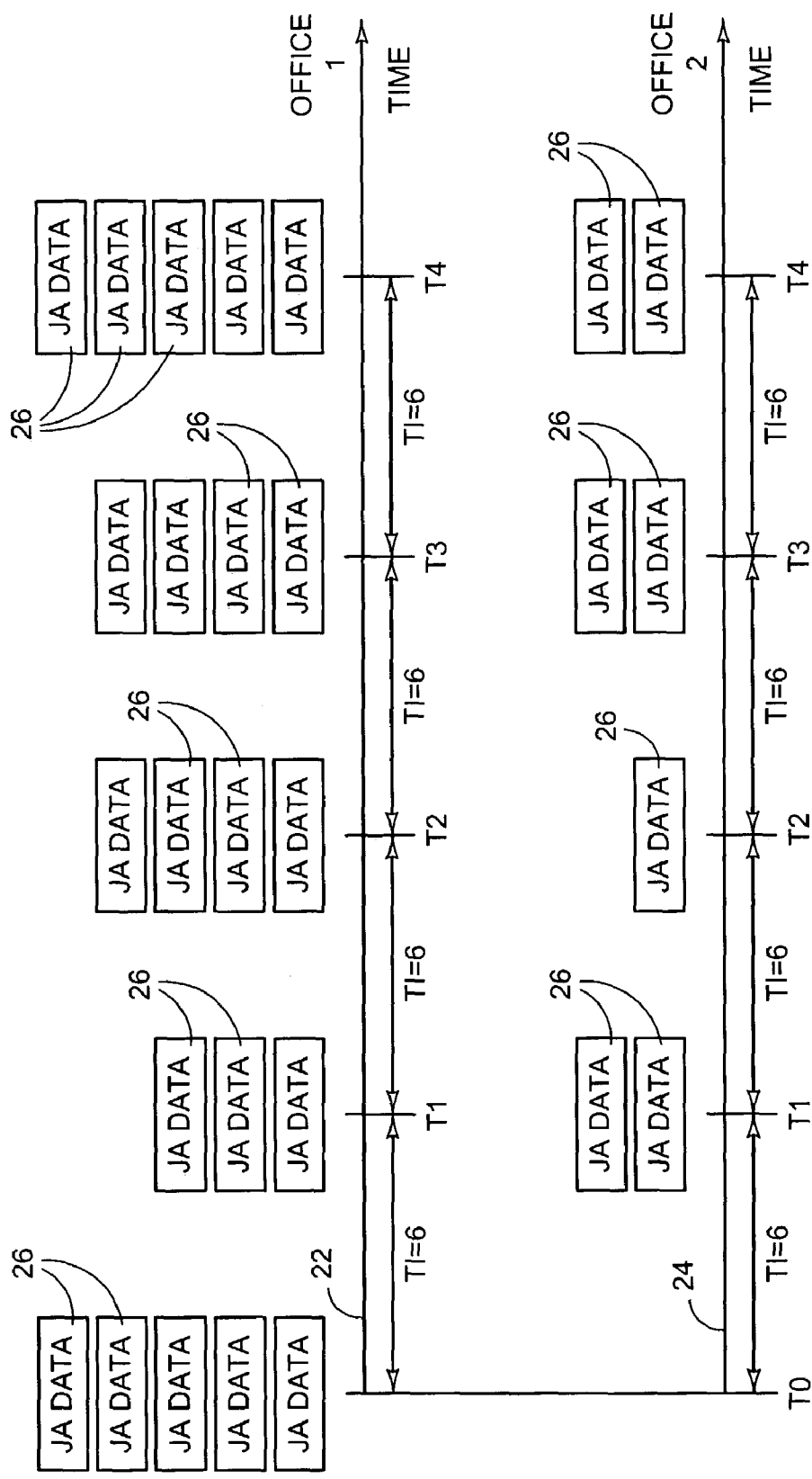
FIG. 1 is an exemplary time sequence diagram depicting a data retrieval method according to the prior art.

FIG. 1 is an exemplary time sequence diagram depicting a data retrieval method 20 according to the prior art. The diagram of method 20 includes a first office timeline 22 and a second office timeline 24, each depicting a time-sequence retrieval of data. The diagram of method 20 further includes time instances T0, T1, T2, T3 and T4, respectively, during each of which a corresponding plurality of data files 26 is retrieved as depicted on the first office timeline 22 and the second office timeline 24, respectively. The method 20, as exemplified in FIG. 1, is performed as follows: at a time T0, a quantity of five data files 26 are retrieved from the first office (not shown) as depicted on the timeline 22. At this same time T0, no data files 26 are retrieved from the second office (not shown) as depicted on the timeline 24. Thus, at time T0, the first office has five files 26 ready to be retrieved, while the second office has none.

Then, the method 20 waits for a fixed interval of time "TI". As depicted in FIG. 1, interval of time T1 is six units in length, with units defined by any suitable unit of time such as minutes, hours, days, etc. For purposes herein, it is assumed that each interval of time TI is equal to six hours.

Then, after waiting for interval of time TI, the method 20 retrieves three data files 26 from the first office (timeline 22) and two data files 26 from the second office (timeline 24) at time T1. Thereafter, the method 20 waits again for the fixed interval of time TI, or six hours.

The method 20 then continues, in a generally iterative 'retrieve-and-wait' fashion substantially as described above, gathering data files 26 in quantities of four, four, and six from the first office (timeline 22), and in quantities of one, two, and two from the second office (timeline 24) at times T2, T3 and T4, respectively.

As depicted in FIG. 1, the method 20 is not responsive to the number of data files 26 (i.e., quantity of data) retrieved from any particular office and/or at any particular time in regard to determining the fixed interval of time TI. As such, the method 20 tends to result, from time to time, in a generally undesirable excess of data files 26 that are awaiting retrieval from a given office as the rate of generation of data files 26 within that given office varies due to any number of factors. This can lead to a general shortage of data storage space within the data handling resources of a given office (not shown in FIG. 1) while awaiting data file 26 retrieval by a main office (not shown in FIG. 1), further leading to an undesirable slowdown or stoppage of data file generation (i.e., work processing) within an office so affected.

Methods and apparatus in accordance with embodiments of the present invention are described hereafter.

Figure 2:
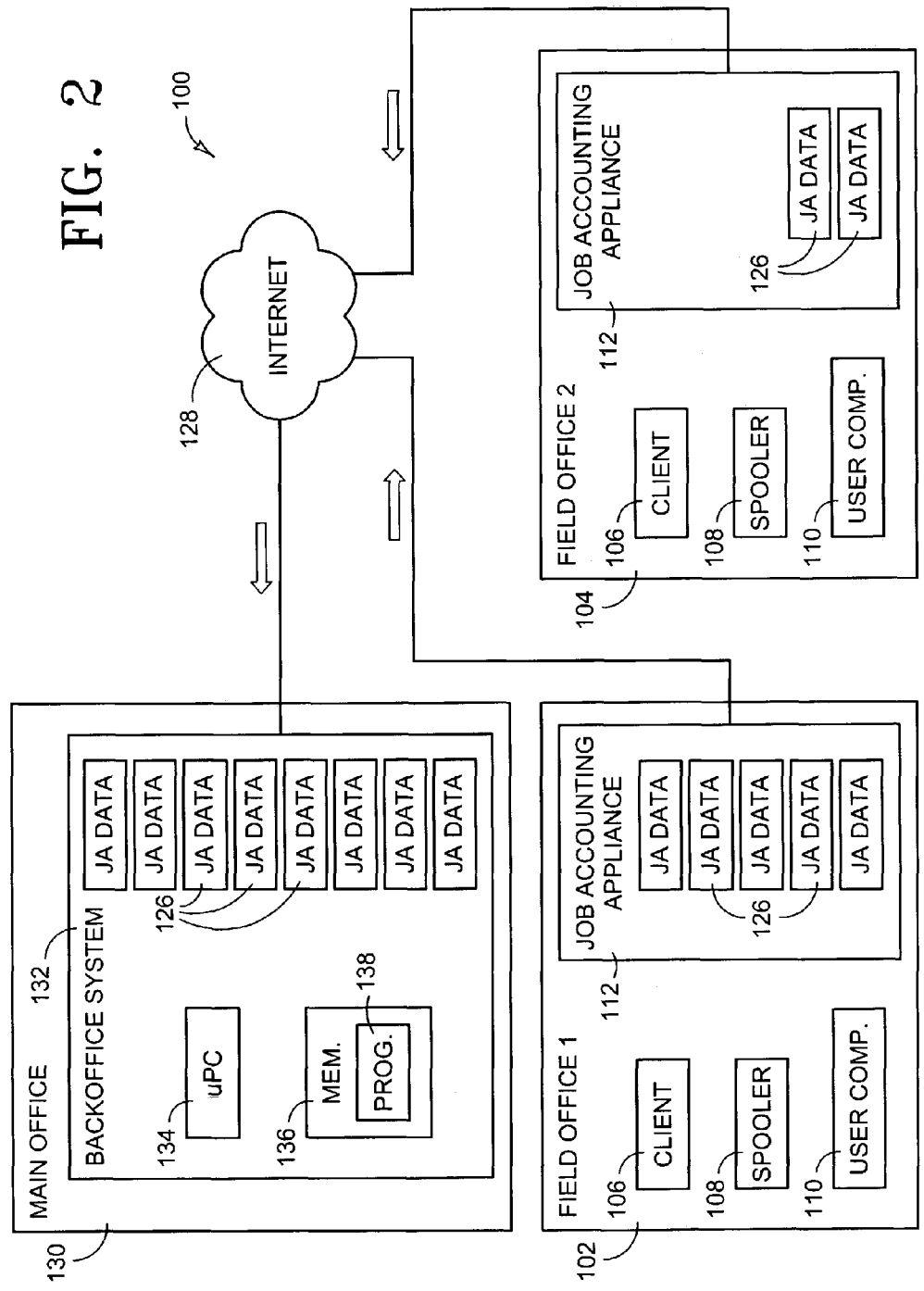
FIG. 2 is a block diagram depicting a data handling system in accordance with an embodiment of the present invention.

FIG. 2 is a block diagram depicting a data handling system 100 in accordance with one embodiment of the present invention. The data handling system 100 includes a first field office (hereafter, first office) 102 and a second field office (hereafter, second office) 104. The first office 102 and the second office 104 each include a client server 106, a spooler 108, and a user computer 110. Each of the client servers 106, the spoolers 108 and the user computers 110 can respectively include any such suitable device that is normally usable in the setup, generation, handling and/or storage of data and job accounting data files (hereafter, data files) 126. One of skill in the data processing and computing arts is familiar with typical such devices 106, 108 and 110, respectively, and further elaboration is not required for purposes of understanding the present invention. Furthermore, other suitable data handling and processing devices (not shown) can also be used in conjunction with the system 100.

Each of the first and second offices 102 and 104 of the data handling system 100 further includes a job accounting appliance (hereafter, JA appliance) 112. Each JA appliance 112 is configured to receive and store data files 126 from each of the corresponding client server 106, the spooler 108, and the user computer 110 within the particular office 102 or 104. Furthermore, each JA appliance 112 is coupled in data communication with the Internet 128. For purposes herein, each JA appliance 112 within the first and second offices 102 and 104 is considered to be a remote entity.

The data handling system 100 also includes a main office 130. The main office 130 includes a backoffice system 132 coupled in data communication with the first office 102 and the second office 104 by way of the Internet 128. The backoffice system 132 can include any suitable data handler configured to retrieve and store data files 126 from the first office 102 and the second office 104 in accordance with the present invention. As depicted in FIG. 2, the backoffice system 132 includes a processor 134 and a memory (i.e., computer-accessible storage media) 136. The memory 136 further includes an executable program code 138 that is configured to cause the processor 134 to perform various normal operations of the backoffice system 132. Typical such normal operations as performed by the processor 134, under the control of the program code 138 and in accordance with the present invention, are described in detail hereafter. The backoffice system 132 is considered to be a local entity for purposes herein. Although field offices 102 and 104 are depicted as being in communication with the main office 130 via the Internet, these entities can also be in communication with one another via a LAN, a WAN, a private internet, or other known network communication systems.

It is to be understood that other suitable embodiments (not shown) of the backoffice system 132 can include any number of other elements and devices such as, for example, data storage devices, additional processors, input/output circuitry, operator interfaces, power supplies, etc., as required and/or desired for the respective range of normal operations associated with a particular embodiment of the backoffice system 132. Further elaboration of the backoffice system 132 is not required for purposes of understanding the present invention.

Furthermore, other embodiments (not shown) of the data handling system 100 can also be used in accordance with the present invention. Such other embodiments (not shown) can include, for example: differing configurations of the first office 102 and/or second office 104; additional similar offices coupled in data communication with the main office 130; additional data file 126 generation, handling or storage devices; printers and other imaging apparatus; etc. Varying embodiments (not shown) of the data handling system 100 can be used as required and/or desired to provide correspondingly ranges of normal operations, while doing so in accordance with the teachings of the present invention. In any case, typical operation of the data handling system 100 is described in detail hereafter.

Figure 3:
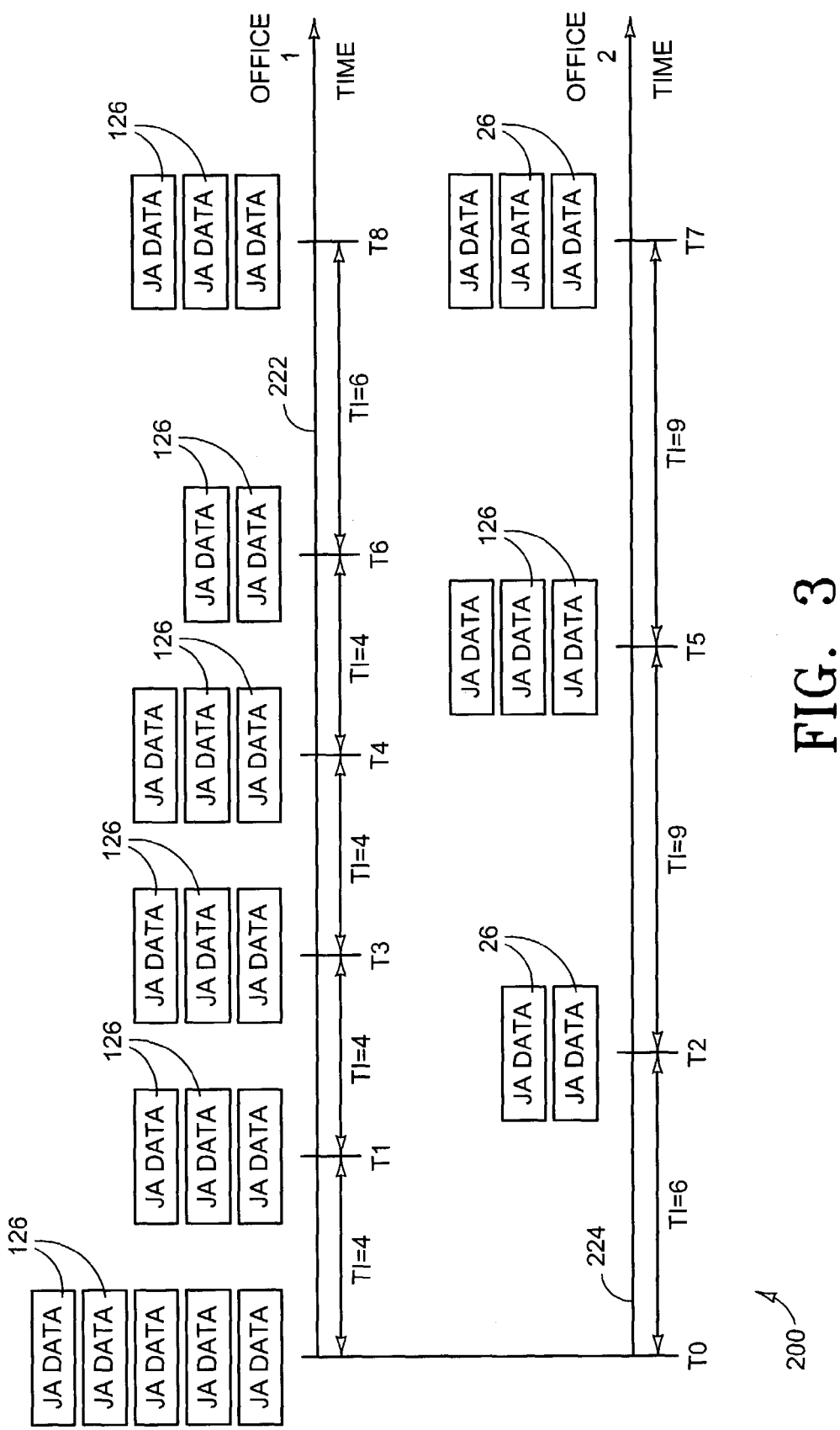
FIG. 3 is an exemplary time sequence diagram depicting a method in accordance with another embodiment of the present invention.

FIG. 3 is an exemplary time sequence diagram depicting a data retrieval method 200 in accordance with another embodiment of the present invention. As depicted in FIG. 3, the diagram of method 200 includes a first office timeline 222 and a second office timeline 224. Each of the timelines 222 and 224 depicts the retrieval of data files 126 at corresponding event times T0 through T8, inclusive, from respectively associated first and second offices "OFFICE 1" and "OFFICE 2" (e.g., first and second offices 102 and 104 of FIG. 2).

Reference is now made to both FIGS. 2 and 3. Exemplary typical operation under the method 200 is as follows: to begin, it is assumed that the most recent retrieval of data files 126 (FIG. 3) took place six units of time (i.e., minutes, hours, etc.) prior to time T0 for each of the first and second offices 102 and 104 (FIG. 2). Thus, the prior interval of time for each of the first and second timelines 222 (FIG. 3) and 224 is six units, respectively (i.e., TI=6).

Then, at time T0 (FIG. 3), the processor 134 (FIG. 2), under the control of the program code 138, causes the backoffice system 132 to retrieve five data files 126 (FIG. 3) from the JA appliance 112 (FIG. 2) of the first office 102 and no data files 126 (FIG. 3) from the JA appliance 112 of the (FIG. 2) second office 104, by way of the Internet 128. After the retrieval is complete, the JA appliance 112 within the first office 102 deletes the five corresponding data files 126 (FIG. 3) stored therein.

In one embodiment of the system 100, the JA appliance within the first office 102 performs the data file 126 deletion automatically after the retrieval. In another embodiment of the system 100, the backoffice system 132 issues a command signal causing the JA appliance 112 to perform the deletion of the data files 126. For example, the backoffice system 132 can issue a file-delete command to the JA applicant 112 after the backoffice system has verified the quality of the files received. Other embodiments of the system 100 can also be used.

Next, the processor 134 (FIG. 2) calculates new (i.e., redefines) retrieval intervals of time for each of the first and second offices 102 and 104 in accordance with the following functional steps:

1) Divide the prior interval of time by the quantity of data retrieved from each of the JA appliance 112 at time T0 to define a data creation period for each office 102 and 104.
   For the first office 102, the data creation period is: (6 time units)/(5 files)=6/5 or 1.2 time units per file.
   For the second office 104, the data creation period is: (6 time units)/(0 files)=undefined, so default to 6 time units per file (no change).
2) Multiply the data creation period for each of the first and second offices 102 and 104 by a predefined, substantially optimum retrieval quantity for each of the JA appliances 112, to redefine the interval of time for retrieving data from each respective office 102 and 104. For purposes of example, it is assumed that a quantity of three files is optimum for each JA appliance 112.
   For the first office 102, the redefined interval of time is: (6/5 time units per file)(3 files optimum)=3.6 units of time. For purposes of example, it is assumed that the processor 134 rounds up to four units of time (i.e., TI=4).
   For the second office 104, the data creation period is presently undefined, so the program code 138 causes the processor 134 to select the prior six units of time as the 'redefined' interval of time (i.e., TI=6).

The processor 134 (FIG. 2) of the backoffice system 132 then waits for each of the redefined intervals of time to expire. As depicted, the processor 134 (FIG. 2) causes the backoffice system 132 to retrieve three data files 126 (FIG. 3) at time T1 from the JA appliance 112 (FIG. 2) of the first office 102, and two data files 126 (FIG. 3) at time T2 from the JA appliance 112 (FIG. 2) of the second office 104. The program code 138 then causes the processor 134 to recalculate (redefine) intervals of time for each of the JA appliances 112 (i.e., first and second offices 102 and 104), in accordance with the method described in steps 1) and 2) above. Thus, the processor 134 redefines the intervals of time as follows:

3) For the first office 102: (4 units)/(3 files)=4/3 time units per file; (4/3 time units per file)(3 files optimum)=4 units of time (i.e., TI=4).
4) For the second office 104: (6 units)/(2 files)=3 time units per file; (3 time units per file)(3 files optimum)=9 units of time (i.e., TI=9).

The processor 134 (FIG. 2) then waits for each of the redefined intervals of time to expire at times T3 (FIG. 3) and T5, respectively. Furthermore, each of the JA appliances 112 (FIG. 2) within the first and second offices 102 and 104 delete their respective copies of the data files 126 (FIG. 3) retrieved at times T1 and T2. The method 200 then continues in a generally iterative 'retrieve, calculate and wait' process substantially as described above and as depicted in FIG. 3. It is noted that data files 126 (FIG. 3) are also retrieved at a time T4 from the JA appliance 112 (FIG. 2) of the first office 102, which occurs prior to the time T5 (FIG. 3). This is due to the relatively shorter intervals of time that are being waited between retrievals from the first office 102 (FIG. 2) versus those of the second office 104 (i.e., TI=4 versus TI=9 of FIG. 3).

Thus, the method 200 provides for dynamically redefining the interval of time that is waited before a subsequent retrieval of data files 126 (i.e., quantity of data) from the first office 102 or the second office 104, in accordance with a function of the prior interval of time, the quantity of data just retrieved, and the substantially optimum (i.e., predefined) retrieval quantity of data, respectively.

In this way, the method 200 of the present invention generally provides for the repetitive gathering of data (i.e., data files 126) from remote entities (i.e., JA appliances 112 within offices 102 and 104) in correspondence to the rate at which data is generated within the particular remote entity. In doing so, the method 200 substantially prevents excessive delays in retrieving the data waiting within the respective remote entities. Thus, excessive data accumulation within the corresponding remote entities is also substantially prevented.

Furthermore, the method 200 also substantially prevents over-aggressive data retrieval by permitting the redefinition of the optimum retrieval quantity. For example, if the storage resources of a particular JA appliance 126 permit, then the corresponding optimum retrieval quantity can be suitably increased by way, for example, of a user input to the backoffice system 132 (as facilitated by a corresponding embodiment of the program code 138, etc.), resulting in a corresponding increase in the interval of time between consecutive data retrievals (decreased data retrieval frequency) by the backoffice system 132 (i.e., local entity).

Such a reduction in data retrieval frequency can be desirable, for example, in circumstances where those responsible for a local entity are paying a per-usage or per-access fee to an Internet service provider (or other network administration agency), or in any other situation where reduced network (i.e., Internet) access frequency is generally favorable. In any case, a re-definable optimum retrieval quantity provides for user-selectable system performance adjustment and tuning.

Figure 4:
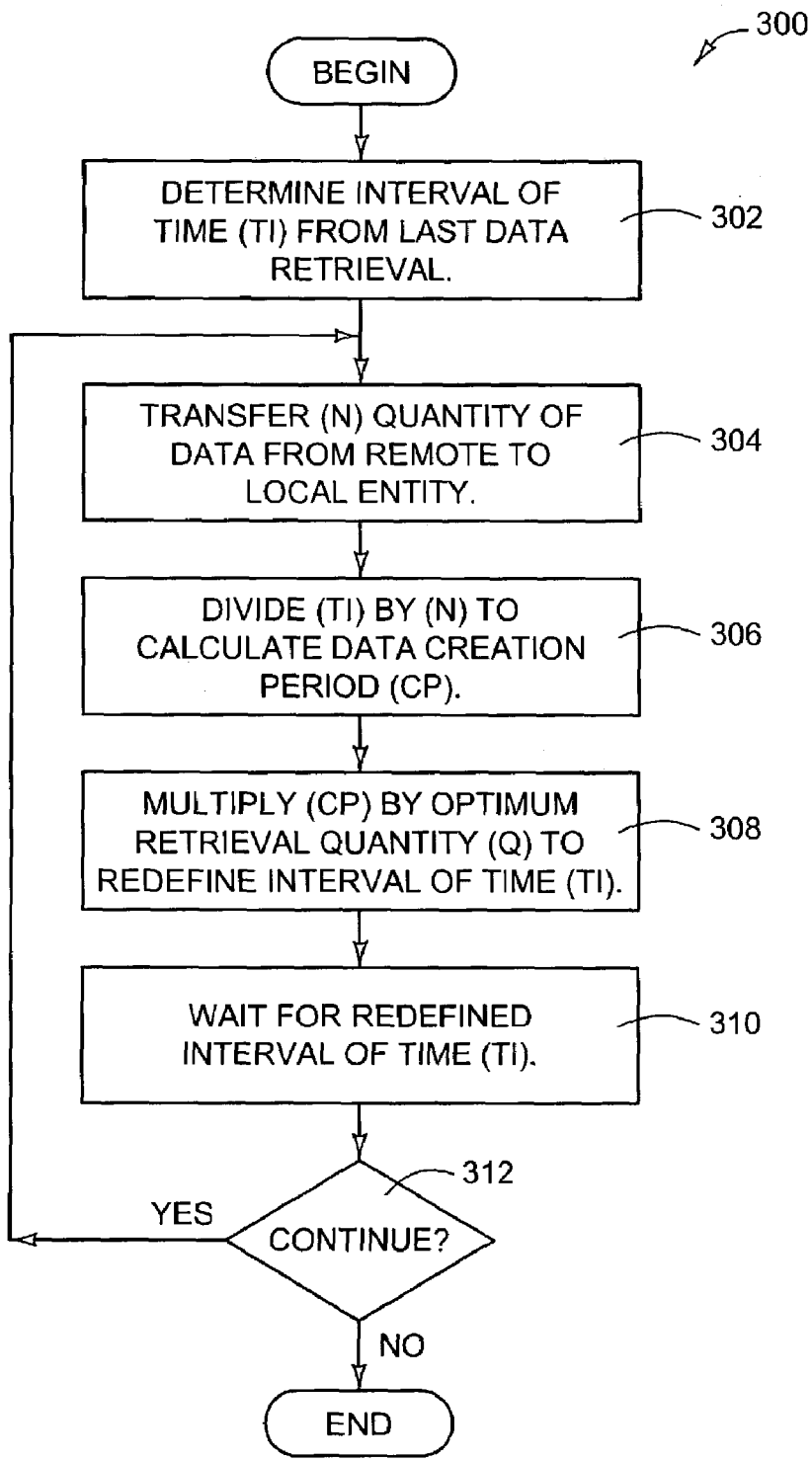
FIG. 4 is a flowchart depicting a method in accordance with still another embodiment of the present invention.

FIG. 4 is a flowchart depicting a data retrieval method 300 in accordance with still another embodiment of the present invention. The method 300 is substantially similar to the method 200 of FIG. 3 as described above. While the method 300 describes particular steps and order of execution, it is to be understood that other methods respectively including other steps and order of execution can also be used in accordance with the present invention. For clarity of understanding, the method 300 will be described within the context of the data handling system 100 of FIG. 2.

In step 302 (FIG. 4), the processor 134 (FIG. 2), which is executing program code 138, determines the most recently waited interval of time (TI) associated with the JA appliance 112 (i.e., remote entity) of the first office 102.

In step 304 (FIG. 4), the processor 134 (FIG. 2) causes a quantity (N) of data files 126 to be retrieved (i.e., transferred) from the JA appliance 112 of the first office 102 to the backoffice system 132 (i.e., local entity) of the main office 130 by way of the Internet 128. The processor 134 thereafter signals the JA appliance 112 of the first office 102 to delete the remote instance of the data files 126 so as to recover the corresponding storage space within the JA appliance 112.

In step 306 (FIG. 4), the processor 134 (FIG. 2) divides the interval of time (TI) by the quantity (N) of data files 126 to calculate a data creation period (CP) for the remote entity (i.e., JA appliance 112 of the first office 102). Thus, (CP)=(TI)/(N). In the event that no data files 126 were retrieved (i.e., (N)=zero), the processor 134 assigns a default value of zero to the data creation period (CP).

In step 308 (FIG. 4), the processor 134 (FIG. 2) multiplies the data creation period (CP) by a predefined optimum retrieval quantity (Q) to redefine the interval of time (TI) that will be used for the next iteration of data file 126 retrieval. Thus, (TI)=(CP)(Q). In the event that (CP)=zero as a result of step 306 above, the processor 134 maintains the existing value of (TI) as determined in step 302 above by default.

In step 310 (FIG. 4), the processor 134 (FIG. 2) waits for the interval of time (T1) as redefined in step 308 above.

In step 312 (FIG. 4), the processor 134 (FIG. 2) determines if additional data retrieval is required. Such a determination can be based, for example, on an operator input to the backoffice system 132, on time of day scheduling, on a data retrieval error detection or other strategy, etc. If the processor 134 determines that additional data retrieval is required, then the method 300 (FIG. 4) returns to step 304 and begins another iteration of the steps 304 through 312, inclusive. If the processor 134 (FIG. 2) determines that no additional data retrieval is required, then the method 300 (FIG. 4) is terminated.

In this way, the method 300 of the present invention provides for the retrieval of data files (i.e., quantities of data) by a local entity from a remote entity at dynamically redefined intervals of time as a function of the most recently waited interval of time, the quantity of data just retrieved, and a predefined (and selectively re-definable) optimum retrieval quantity. Thus, the method 300 generally optimizes the rate at which data is retrieved from a remote entity in correspondence to the rate at which that data is being generated by the remote entity. In turn, the method 300 substantially eliminates both excessive data accumulation within the remote entity and unnecessarily frequent network access (i.e., data retrieval by way of the Internet).

Furthermore, respective embodiments of the method 200 of FIG. 3 and the method 300 of FIG. 4 can use predetermined (i.e., optimum) retrieval quantities that are based upon a predetermined optimization formula. One example of such a formula is as follows:

5) Optimum file retrieval count=((optimum retrieval packet size−overhead)/file size);
  wherein, for example: optimum retrieval packet size=4,000 bytes; overhead=100 bytes; and file size=500 bytes.

Under such an exemplary arrangement, the optimum file retrieval count (i.e., number of data files 126 of FIG. 3) would be: ((4,000−100)/500)=7.8 files; rounded up to 8 (eight) files per retrieval. Thus, the optimum data retrieval quantity would be: (4,000−100)=3,900 bytes of data per retrieval. Note that overhead is generally referred to as information required for executing the data retrieval such as, for example, routing information, identity and/or verification stamping, encryption information, time and date stamps, etc. Thus, overhead is not generally considered to be a part of the data being retrieved (i.e., the data files 126 of FIG. 3) within a given data packet. Other predetermined optimization formulas can also be used in correspondence with varying embodiments of the methods 200 and 300 described above.

While the above methods and apparatus have been described in language more or less specific as to structural and methodical features, it is to be understood, however, that they are not limited to the specific features shown and described, since the means herein disclosed comprise preferred forms of putting the invention into effect. The methods and apparatus are, therefore, claimed in any of their forms or modifications within the proper scope of the appended claims appropriately interpreted in accordance with the doctrine of equivalents.

We claim:

1. A method of retrieving data, comprising:
  waiting for a predefined interval of time;
  retrieving a first quantity of data from a remote entity after the predefined interval of time; and
  redefining the interval of time in accordance with a predefined function, wherein the redefining is performed responsive to the retrieving of a first quantity of data from a remote entity, and wherein the predefined function includes:
    dividing the predefined interval of time by a quantity corresponding to the first quantity of data to define a data creation period; and
    multiplying the data creation period by a predefined quantity to redefine the interval of time.

2. The method of claim 1, and further comprising:
  waiting for the redefined interval of time; and
  retrieving a second quantity of data from the remote entity after the redefined interval of time.

3. The method of claim 1, and wherein the retrieving the first quantity of data includes deleting the first quantity of data at the remote entity.

4. The method of claim 1, and wherein the predefined quantity is defined as a predefined optimum retrieval quantity.

5. The method of claim 1, and wherein the predefined quantity is defined as a re-definable retrieval quantity.

6. The method of claim 1, and wherein the predefined quantity is defined as an optimum file retrieval count determined in accordance with a predefined optimization formula.

7. The method of claim 6, and wherein the predefined optimization formula is defined as:
  optimum file retrieval count=((optimum retrieval packet size—overhead)/file size).

8. The method of claim 1, and wherein retrieving the first quantity of data from the remote entity is performed by way of the Internet.

9. A data handling system, comprising:
  a remote entity configured to store data;
  a local entity coupled in data communication with the remote entity, the local entity configured to:
    wait for a predefined interval of time;
    retrieve a first quantity of data from the remote entity after the
    predefined interval of time, wherein the first quantity of data defines a retrieval quantity; and
    redefine the interval of time in accordance with a predefined function responsive to the retrieval of a first quantity of data from the remote entity, wherein the predefined function includes:
      dividing the predefined interval of time by the retrieval quantity to define a data creation period; and
      multiplying the data creation period by a predefined quantity to redefine the interval of time.

10. The data handling system of claim 9, and wherein the local entity is further configured to:
  wait for the redefined interval of time; and
  retrieve a second quantity of data from the remote entity after the redefined interval of time.

11. The data handling system of claim 9, and wherein the local entity is further configured such that the predefined quantity is defined by a predefined optimum retrieval quantity.

12. The data handling system of claim 9, and wherein the local entity is further configured such that the predefined quantity is selectively re-definable in response to an input.

13. The data handling system of claim 9, and wherein the local entity is further configured such that the predefined quantity is defined as an optimum file retrieval count determined in accordance with a predetermined optimization formula.

14. The data handling system of claim 13, and wherein the local entity is further configured such that the predetermined optimization formula is defined as:

optimum file retrieval count=((optimum retrieval packet size—overhead)/file size).

15. The data handling system of claim 9, and wherein the remote entity is further configured to delete the first quantity of data at the remote entity in response to retrieving the first quantity of data.

16. The data handling system of claim 9, and wherein the local entity includes a data storage device configured to store the first quantity of data in correspondence to the retrieval of the first quantity of data from the remote entity.

17. The data handling system of claim 9, and wherein the local entity is coupled in data communication with the remote entity by way of the Internet.

18. A computer-accessible storage media including an executable program code, the program code configured to cause a processor to:
wait for a predefined interval of time;
retrieve a first quantity of data after the predefined interval of time; and
redefine the interval of time in accordance with a predefined function responsive to the retrieval of a first quantity of data, wherein the predefined function causes the processor to:
determine a retrieval quantity corresponding to the first quantity of data;
divide the predefined interval of time by the retrieval quantity to define a data creation period: and
multiply the data creation period by a predefined quantity to redefine the interval of time.

19. The computer-accessible storage media of claim 18, and wherein the program code is further configured to cause the processor to:
wait for the redefined interval of time; and
retrieve a second quantity of data after the redefined interval of time.

20. The computer-accessible storage media of claim 18, and wherein the program code is further configured to causes the processor to re-define the predefined quantity in response to an input.

21. The computer-accessible storage media of claim 18, and wherein the program code is further configured to cause the processor to determine the predefined quantity as an optimum file retrieval count determined in accordance with a predetermined optimization formula.

22. The computer accessible storage media of claim 21, and wherein the program code is further configured such that the predetermined optimization formula is defined as:

optimum file retrieval count=((optimum retrieval packet size—overhead)/file size).

23. The computer-accessible storage media of claim 18, and wherein the program code is further configured to cause the processor to cause a remote entity to delete the first quantity of data at the remote entity in response to retrieving the first quantity of data.

24. The computer-accessible storage media of claim 18, and wherein the program code is further configured to cause the processor to retrieve the first quantity of data from a remote entity by way of the Internet.

25. A data system, comprising:
a remote entity configured to store data;
a user computer coupled in data communication with the remote entity and configured to generate and store data within the remote entity; and
a local entity coupled in data communication with the remote entity, the local entity configured to:
wait for a predefined interval of time;
retrieve a first quantity of data defining a retrieval quantity from the remote entity after the predefined interval of time;
divide the predefined interval of time by the retrieval quantity to define a data creation period;
multiply the data creation period by a predefined quantity to redefine the interval of time;
wait for the redefined interval of time; and
retrieve a second quantity of data from the remote entity after the redefined interval of time.

26. The data system of claim 25, and wherein the local entity is coupled in data communication with the remote entity by way of the Internet.

27. The data system of claim 25, and wherein the local entity is further configured to re-define the predefined quantity in response to an input.

28. The data system of claim 25, and wherein the local entity is further configured to cause the remote entity to delete the first quantity of data stored within the remote entity after retrieving the first quantity of data.

29. The data system of claim 25, and wherein the remote entity is configured to delete the first quantity of data stored within the remote entity in response to retrieving the first quantity of data.

30. The data system of claim 25, and wherein the local entity is further configured to determine the predefined quantity as an optimum file retrieval count in accordance with a predefined optimization formula.

31. The data system of claim 30, and wherein the local entity is further configured such that the predefined optimization formula is defined as: optimum file retrieval count= ((optimum retrieval packet size—overhead)/file size).

32. The data system of claim 25, and further comprising:
another remote entity configured to store data;
another user computer coupled in data communication with the other remote entity, the user computer configured to generate and store data within the other remote entity, and wherein the local entity is further configured to:
wait for another predefined interval of time; retrieve a third quantity of data defining another retrieval quantity from the
other remote entity after the other predefined interval of time;
divide the other predefined interval of time by the other retrieval quantity to define another data creation period;
multiply the other data creation period by another predefined quantity to redefine the other interval of time;
wait for the other redefined interval of time; and
retrieve a fourth quantity of data from the other remote entity after the other redefined interval of time.

* * * * *

UNITED STATES PATENT AND TRADEMARK OFFICE
CERTIFICATE OF CORRECTION

PATENT NO. : 7,107,423 B2 Page 1 of 1
APPLICATION NO. : 10/616762
DATED : September 12, 2006
INVENTOR(S) : Timothy P. Blair et al.

It is certified that error appears in the above-identified patent and that said Letters Patent is hereby corrected as shown below:

In column 7, line 9, delete "(T1)" and insert -- (TI) --, therefor.

In column 9, line 38, in Claim 18, delete "period:" and insert -- period; --, therefor.

Signed and Sealed this

Eleventh Day of August, 2009

David J. Kappos
*Director of the United States Patent and Trademark Office*